United States Patent
Fujii

(10) Patent No.: US 10,694,054 B2
(45) Date of Patent: Jun. 23, 2020

(54) INFORMATION PROCESSING APPARATUS, IMAGE READING APPARATUS, IMAGE FORMING APPARATUS, AND NON-TRANSITORY COMPUTER READABLE MEDIUM

(71) Applicant: FUJI XEROX CO., LTD., Tokyo (JP)

(72) Inventor: Masaru Fujii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/010,233

(22) Filed: Jan. 29, 2016

(65) Prior Publication Data
US 2017/0064102 A1 Mar. 2, 2017

(30) Foreign Application Priority Data
Aug. 28, 2015 (JP) .................................. 2015-168652

(51) Int. Cl.
*H04N 1/00* (2006.01)
(52) U.S. Cl.
CPC ..... *H04N 1/00411* (2013.01); *H04N 1/00466* (2013.01); *H04N 1/00482* (2013.01); *H04N 2201/0094* (2013.01)
(58) Field of Classification Search
CPC ........... H04N 1/00411; H04N 1/00482; H04N 2201/0094
See application file for complete search history.

(56) References Cited

U.S. PATENT DOCUMENTS

| | | | | |
|---|---|---|---|---|
| 5,678,135 A | * | 10/1997 | Fukui | G03G 15/50 345/902 |
| 9,697,548 B1 | * | 7/2017 | Jaff | G06Q 30/0601 |
| 2003/0214684 A1 | * | 11/2003 | Kuboki | H04N 1/00384 358/474 |
| 2004/0201662 A1 | * | 10/2004 | Hwang | B41J 13/103 347/104 |
| 2012/0120440 A1 | * | 5/2012 | Ueda | H04N 1/00344 358/1.15 |
| 2013/0114100 A1 | * | 5/2013 | Torii | G06F 11/0733 358/1.14 |
| 2014/0092405 A1 | * | 4/2014 | Park | G06F 3/1205 358/1.9 |

(Continued)

FOREIGN PATENT DOCUMENTS

| | | |
|---|---|---|
| JP | 2005-266364 A | 9/2005 |
| JP | 2009-164967 A | 7/2009 |
| JP | 2012-114792 A | 6/2012 |

OTHER PUBLICATIONS

Mar. 29, 2019 Office Action issued in Japanese Patent Application No. 2015-168652.

(Continued)

*Primary Examiner* — King Y Poon
*Assistant Examiner* — Michael Burleson
(74) *Attorney, Agent, or Firm* — Oliff PLC

(57) ABSTRACT

An information processing apparatus includes a setting unit and a display controller. The setting unit sets setting information to be used when reading image data from a document by a reader. The display controller performs control so that an instruction concerning how to set the document in the reader will be displayed for a user, on the basis of plural items of setting information set by the setting unit.

9 Claims, 16 Drawing Sheets

(56) References Cited

U.S. PATENT DOCUMENTS

2015/0043042 A1* 2/2015 Kato ................... H04N 1/12
                                                358/474
2016/0057301 A1* 2/2016 Motoyama .......... H04N 1/3263
                                                358/406

OTHER PUBLICATIONS

Dec. 21, 2018 Office Action issued in Japanese Application No. 2015-168652.

* cited by examiner

FIG. 6

SCAN APPLICATION

PLEASE SELECT TYPE OF DOCUMENT TO BE SCANNED.

- CONTRACT WITH COMPANY A
- CONTRACT WITH COMPANY B
- TRAVEL EXPENSE REIMBURSEMENT REQUEST
- MINUTES
- MARKING RESULTS

OK   CANCEL

FIG. 7

SCAN APPLICATION    (CONTRACT WITH COMPANY A)

SETTING CONTENTS OF SCAN PARAMETERS ARE AS FOLLOWS.

| DOCUMENT SETTING ORIENTATION |
|---|
| DOCUMENT-READABLE ORIENTATION |
| COUNTERCLOCKWISE 90°-ROTATED ORIENTATION |
| AUTO |

| TWO-SIDED/ONE-SIDED |
|---|
| TWO-SIDED |
| ONE-SIDED |

| DOCUMENT TYPE |
|---|
| TEXT |
| PHOTO |

| QR CODE |
|---|
| YES |
| NO |

| COLOR/MONOCHROME |
|---|
| COLOR |
| MONOCHROME |

OK    CANCEL

INFORMATION PROCESSING APPARATUS, IMAGE READING APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-168652 filed Aug. 28, 2015.

BACKGROUND

Technical Field

The present invention relates to an information processing apparatus, an image reading apparatus, an image forming apparatus, and a non-transitory computer readable medium.

SUMMARY

According to an aspect of the invention, there is provided an information processing apparatus including a setting unit and a display controller. The setting unit sets setting information to be used when reading image data from a document by a reader. The display controller performs control so that an instruction concerning how to set the document in the reader will be displayed for a user, on the basis of plural items of setting information set by the setting unit.

BRIEF DESCRIPTION OF THE DRAWINGS

An exemplary embodiment of the present invention will be described in detail based on the following figures, wherein:

FIG. 6 illustrates an example of the display screen when "contract with company A" is selected as a document type on the display screen shown in FIG. 5;

FIG. 7 illustrates an example of the display screen when "contract with company A" is selected as a document type on the display screen shown in FIG. 6;

FIGS. 10 through 14 illustrate examples of the display screen for explaining how a guiding image will be changed in accordance with a change in the setting contents of scan parameters;

DETAILED DESCRIPTION

An exemplary embodiment of the present invention will be described below in detail with reference to the accompanying drawings.

Figure 1:
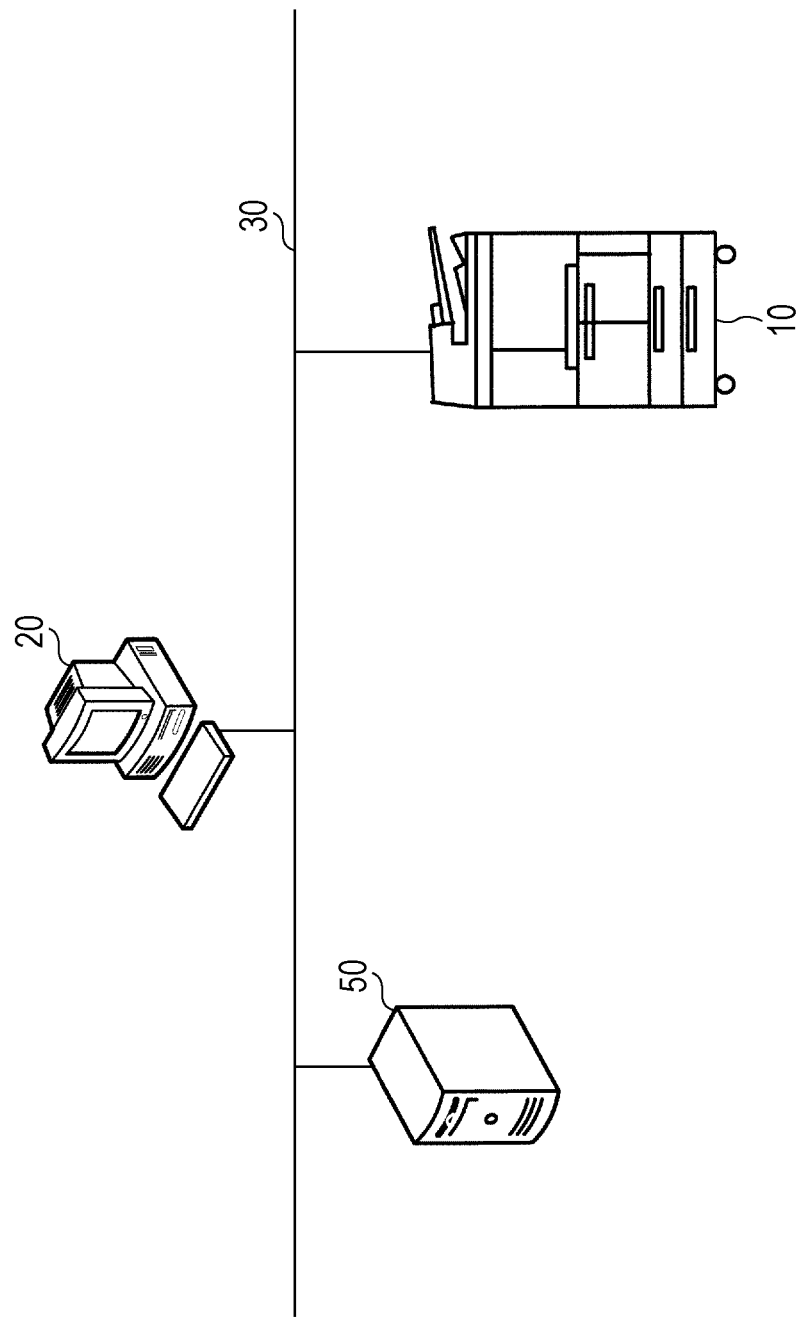
FIG. 1 illustrates an example of the configuration of an image forming system according to an exemplary embodiment of the invention.

FIG. 1 illustrates an example of the configuration of an image forming system according to an exemplary embodiment of the present invention.

As shown in FIG. 1, the image forming system includes an image forming apparatus 10, a terminal device 20, and a server device 50 connected to one another via a network 30. The terminal device 20 generates print data and sends the generated print data to the image forming apparatus 10 via the network 30. The image forming apparatus 10 receives the print data sent from the terminal device 20 and outputs an image indicated by the print data on a sheet. The image forming apparatus 10 is a so-called multifunction device having plural functions, such as a print function, a scan function, a copy function, and a fax function.

The server device 50 is accessible from the terminal device 20 and the image forming apparatus 10 and has functions of storing image data read in the image forming apparatus 10 and transferring stored data to the terminal device 20.

Figure 2:
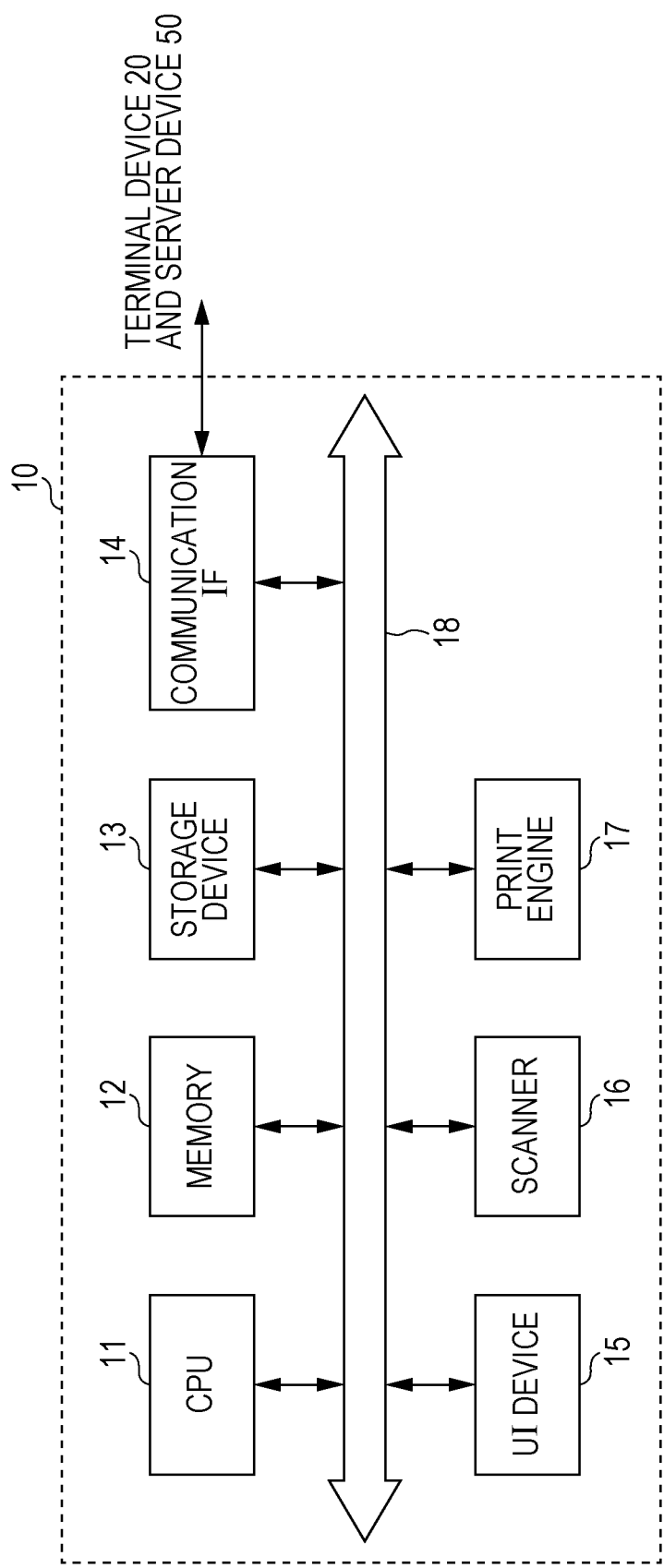
FIG. 2 is a block diagram illustrating an example of the hardware configuration of an image forming apparatus according to an exemplary embodiment of the invention.

An example of the hardware configuration of the image forming apparatus 10 of the image forming system according to this exemplary embodiment is shown in FIG. 2.

The image forming apparatus 10 includes a central processing unit (CPU) 11, a memory 12, a storage device 13, such as a hard disk drive (HDD), a communication interface (IF) 14 that sends and receives data to and from external devices via the network 30, a user interface (UI) device 15 including a touch panel or a liquid crystal display and a keyboard, a scanner 16, and a print engine 17. These elements are connected to one another via a control bus 18.

The print engine 17 prints an image on a recording medium, such as printing paper, after performing steps of charging, exposure, developing, transfer, and fixing.

The CPU 11 executes predetermined processing on the basis of a control program stored in the memory 12 or the storage device 13 so as to control the operation of the image forming apparatus 10. In this exemplary embodiment, the CPU 11 reads and executes a control program stored in the memory 12 or the storage device 13. However, the control program may be stored in a storage medium, such as a compact disc read only memory (CD-ROM), and be provided to the CPU 11.

Figure 3:
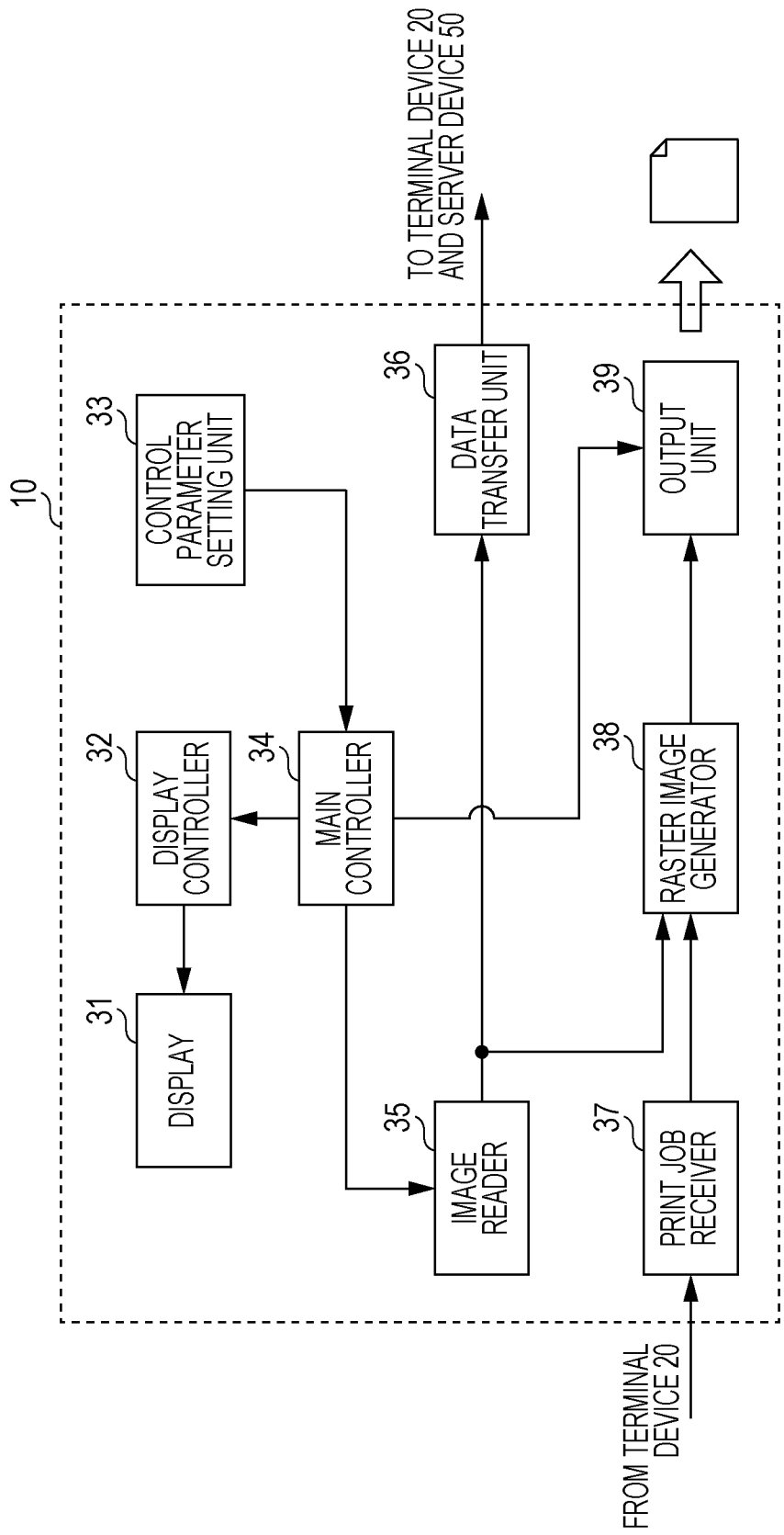
FIG. 3 is a block diagram illustrating an example of the functional configuration of the image forming apparatus.

FIG. 3 is a block diagram illustrating an example of the functional configuration of the image forming apparatus 10, which is implemented by executing the above-described control program.

As shown in FIG. 3, the image forming apparatus 10 includes a display 31, a display controller 32, a control parameter setting unit 33, a main controller 34, an image reader 35, a data transfer unit 36, a print job receiver 37, a raster image generator 38, and an output unit 39.

The image reader 35 serves as a reader that reads image data from a document.

The data transfer unit 36 transfers image data read by the image reader 35 to a specified destination.

The print job receiver 37 receives a print job (print command) sent from the terminal device 20.

The raster image generator 38 generates raster-format print data used for performing printing, on the basis of the print job received by the print job receiver 37 and the image data read by the image reader 35.

The output unit 39 outputs an image based on the image data read by the image reader 35 and the print job received by the print job receiver 37 on a recording medium, such as printing paper. More specifically, the output unit 39 executes processing for printing an image indicated by the raster-format print data generated by the raster image generator 38 on a recording medium.

The control parameter setting unit 33 is a setting unit for setting control parameters (setting information), such as scan parameters and print parameters. The scan parameters are used when reading image data from a document by the image reader 35.

The print parameters are setting information concerning printing processing, such as the number of print copies, whether two-sided printing or one-sided printing is selected, whether color printing or monochrome printing is selected, and whether or not aggregate printing will be performed. The scan parameters are setting information concerning reading processing for reading image data from a document, concerning data processing of read image data, and concerning a destination to which read image data will be transferred. Specific examples of the scan parameters are a document setting orientation, a document type, a reading document size, a reading color mode, and a reading resolution, and whether or not two-sided reading will be performed.

The scan parameters are not restricted to the above-described examples. Various other settings, such as a file format type, a transfer format (e-mail, fax sending, or folder storage), a file name to be appended, and whether or not various functions will be provided, such as auto erect, border erase, optical character recognition (OCR) processing, blank-page skipping, tilt compensation, enlargement or reduce processing, encryption, and digital signature appending, may be similarly applied.

The display 31 is constituted by, for example, a touch panel, and displays the operating state of the image forming apparatus 10 and the setting contents of various control parameters for a user.

The display controller 32 performs control so that an instruction concerning how to set a document in the image reader 35 will be displayed on the display 31 for a user, on the basis of plural scan parameters (setting information) set by the control parameter setting unit 33.

More specifically, the display controller 32 performs control so that an image generated on the basis of a combination of the setting contents of plural scan parameters will be displayed on the display 31 as a guiding image for setting a document.

Every time the setting content of a scan parameter is changed, the display controller 32 may perform control so that a guiding image for instructing a user how to set a document will be changed and displayed on the display 31. Alternatively, after settings of all scan parameters have been completed, the display controller 32 may perform control so that a guiding image reflecting the setting contents of the set scan parameters will be displayed for a user on the display 31.

This guiding image includes, not only an image, such as an animated image, indicating an instruction concerning how to set a document, but a text image describing how to set a document.

The main controller 34 controls the image reader 35 and the output unit 39 on the basis of the control parameters set by the control parameter setting unit 33. Information concerning the control parameters set by the control parameter setting unit 33 is also supplied to the display controller 32 from the main controller 34.

The display controller 32 in this exemplary embodiment performs control so that a guiding image for instructing a user how to set a document will be displayed on the display 31, on the basis of, among various scan parameters, scan parameters concerning reading processing for reading image data from a document by the image reader 35.

That is, a guiding image displayed on the display 31 by the display controller 32 is an image that enables a user to understand the content of currently set plural parameters and that instructs the user to check when setting a document to make sure that there are no inconsistencies between the setting contents set for scan processing and the content of the document to be set.

For example, if a guiding image displayed on the display 31 indicates that a scan mode using a two-dimensional code, such as a QR (Quick Response) code (registered trademark), is set, and if there is no QR code in the document to be set by the user, it is seen that there are inconsistencies between the set scan parameters and the document to be set.

If a guiding image displayed on the display 31 indicates that a two-sided reading mode is set, and if a document to be set by the user is a one-sided document, it is seen that there are inconsistencies between the set scan parameters and the document to be set.

In this exemplary embodiment, the above-described guiding image indicates, not the setting content of a single scan parameter, but the setting contents of at least two scan parameters together.

More specifically, the display controller 32 causes the display 31 to display a guiding image based on information concerning, among various scan parameters, at least two of scan parameters, that is, a document setting orientation, a document type, a reading document size, a reading color mode, a reading resolution, whether or not two-sided reading is specified, and whether or not a two-dimensional code is used.

The image reader 35 includes a duplex auto document feeder (DADF) unit (automatic two-sided document feeder) that is capable of sequentially feeding and reading plural documents and a platen unit (single page document reader) that can set and read only a single page of a document at one time.

The display controller 32 may change an instruction how to set a document to be provided to a user, on the basis of the operating states of the DADF unit and the platen unit.

More specifically, if an abnormality has occurred to the DADF unit for some reason and the DADF unit is unable to function properly, the display controller 32 displays a guiding image on the display 31 indicating that the DADF unit is out of order and a user is instructed not to set a document in the DADF unit.

The operation of the image forming apparatus 10 will be described below in detail with reference to the accompanying drawings.

Figure 4:
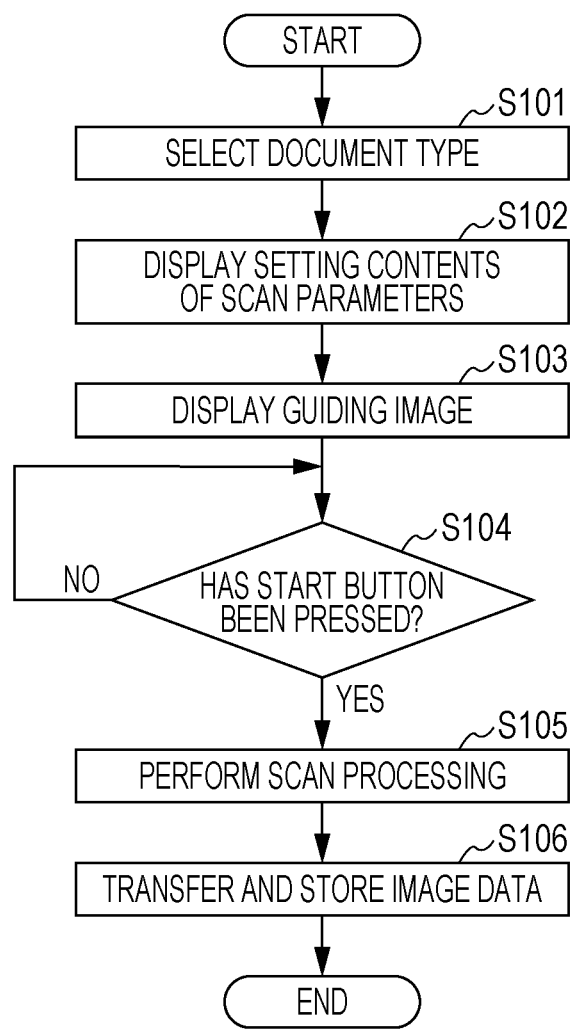
FIG. 4 is a flowchart illustrating processing to be executed when scan processing for reading image data from a document is performed by the image forming apparatus.

FIG. 4 is a flowchart illustrating processing to be executed when scan processing for reading image data from a document is performed by the image forming apparatus 10. In the processing shown in this flowchart, scan parameters are registered for each document type in advance, and when a user selects a document type, scan parameters registered for this document type are automatically set.

Figure 5:
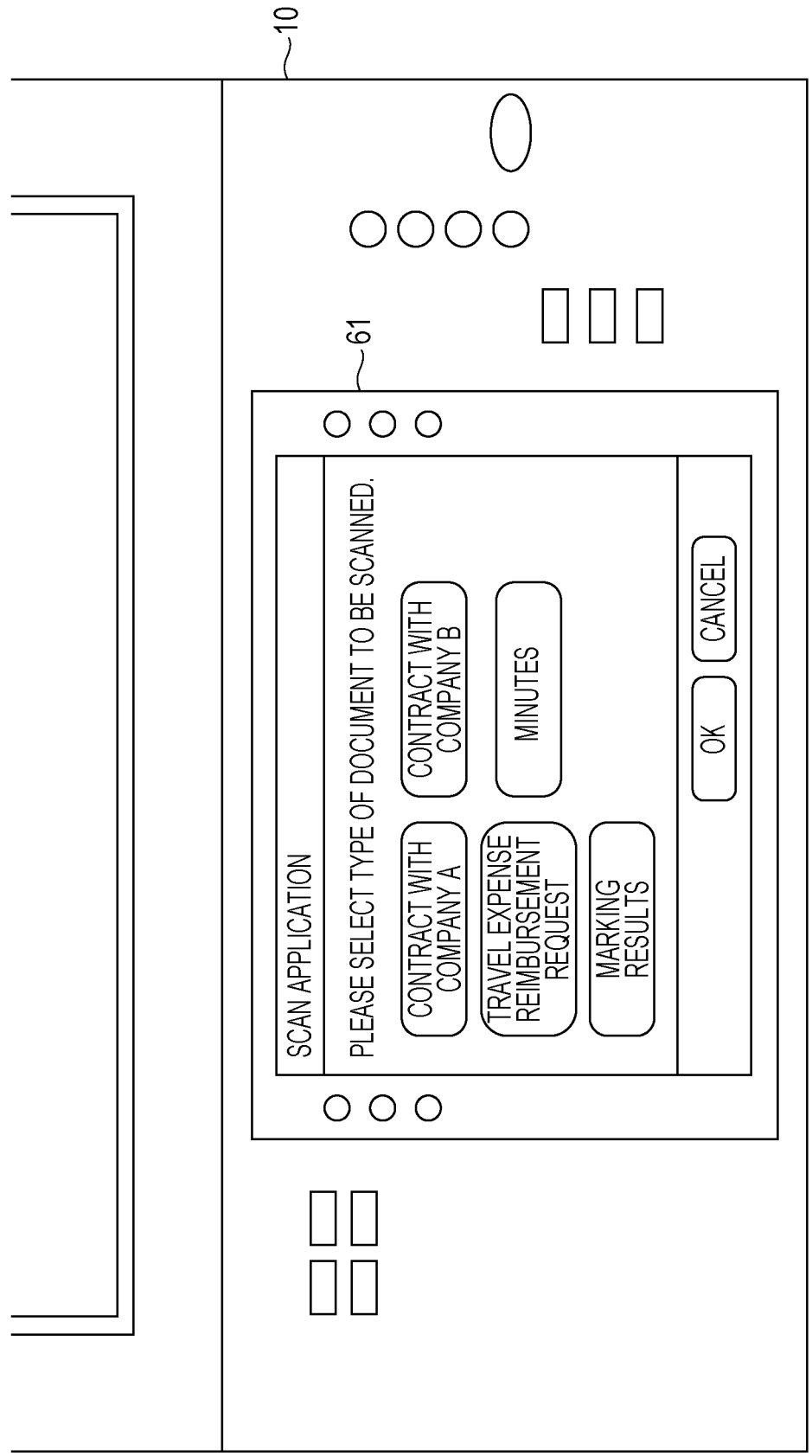
FIG. 5 illustrates an example of the display screen to be displayed for selecting a document type on an operation panel of the image forming apparatus.

When scan application software is started, an image for instructing a user to select a document type is displayed on the display 31. For example, the image shown in FIG. 5 is displayed on an operation panel 61 of the image forming apparatus 10. Then, in step S101, the user selects a document type of document to be scanned, on the basis of the image shown in FIG. 5.

For example, it is assumed that the user has selected "contract with company A" as a document type, as shown in FIG. 6, on the display screen shown in FIG. 5. The example of the display screen shown in FIG. 6 is an enlarged view of only the display content of the operation panel 61 shown in FIG. 5.

On the display screen shown in FIG. 6, "contract with company A" is selected as a document type, and an OK button is pressed. Then, a display screen, such as that shown in FIG. 7, is displayed, and the setting contents of scan parameters registered for the document type "contract with company A" are displayed in step S102.

On the display screen shown in FIG. 7, as the document setting orientation, "document-readable orientation" is set, as the use of a QR code, "Yes" is set, as the two-sided/one-sided reading mode, "one-sided" is set, as the color/monochrome reading mode, "monochrome" is set, and as the document type, "text" is set.

Figure 8:
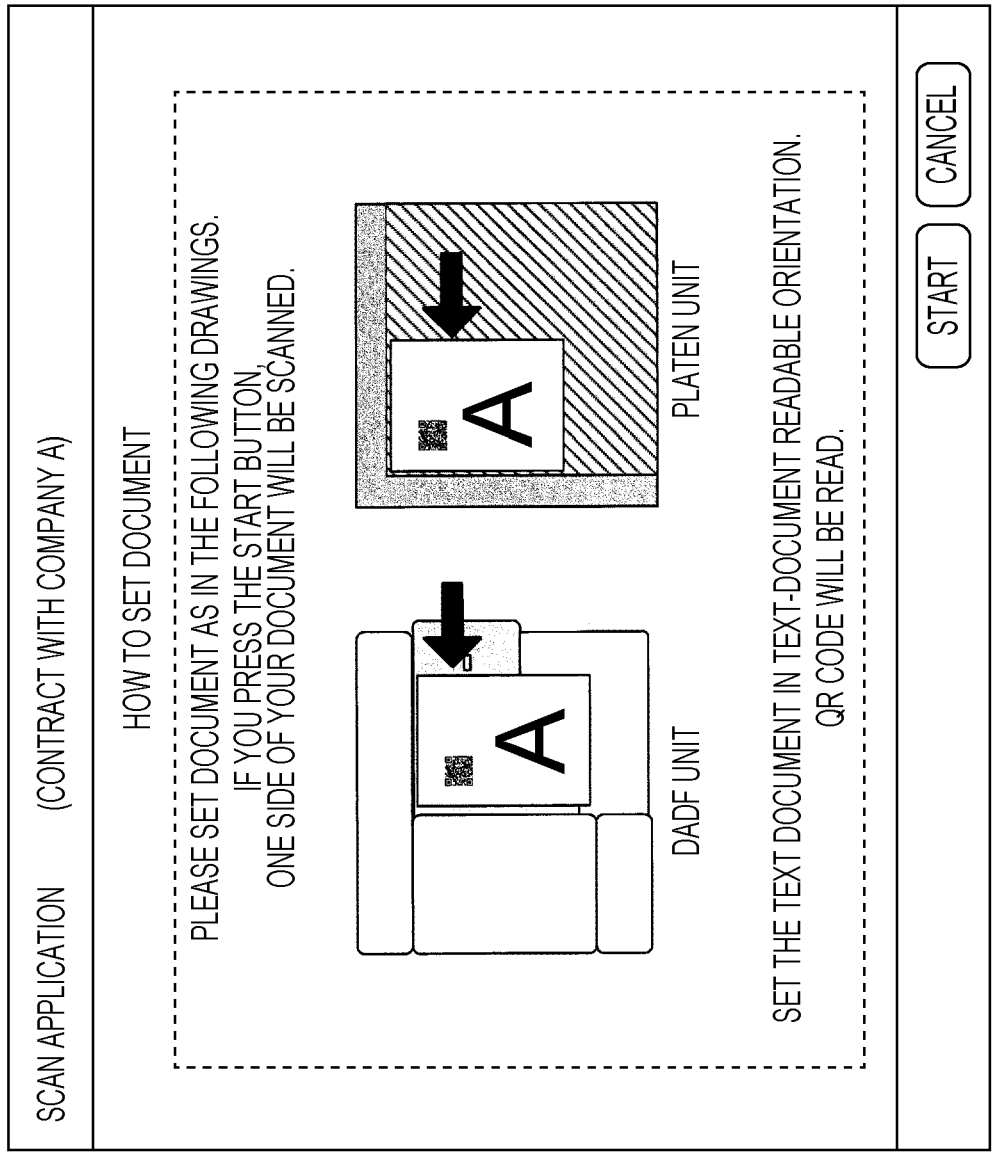
FIG. 8 illustrates an example of a guiding image to be displayed when the setting contents of scan parameters shown in FIG. 7 are checked and an OK button is pressed.

Then, when the user checks the setting contents of the scan parameters and presses the OK button, a display screen, such as that shown in FIG. 8, is displayed, and a guiding image based on the currently set scan parameters is displayed in step S103.

In the example of the display screen shown in FIG. 8, a text message, such as "if you press the start button, one side of your document will be scanned" is displayed, and the user can see that the one-sided/two-sided reading mode is set to be "one-sided". As the scan parameter concerning the document setting orientation, "document-readable orientation" is set. Accordingly, a character image "A" is indicated in an erect state on a sheet which is set in each of the DADF unit and the platen unit, and a text message "set the text document in a text-document readable orientation" is displayed.

Additionally, since a text message "set the text document in a text-document readable orientation" is displayed, the user can see that "text" is set as the document type.

An image of a QR code is displayed on a sheet which is set in each of the DADF unit and the platen unit, and a text message "QR code will be read" is displayed. Then, the user can see that the QR-code reading mode (QR-code "Yes" mode) is set.

The QR code is read when the document is scanned, and is used as destination information when image data read from the document is transferred by fax or by scanning, or is used as information when attribute information concerning various attributes is added to the image data read from the document.

In FIG. 8, both of the DADF unit and the platen unit are displayed, and the user can see that the user may set the document in either one of the DADF unit and the platen unit.

Then, the user sets the document in the image reader 35 while referring to the displayed instruction concerning how to set a document, and then presses the start button. In other words, it is determined in step S104 whether or not the start button has been pressed. Then, in step S105, the image reader 35 performs scan processing on the basis of the content of the set scan parameters.

Then, in step S106, the image data read by the image reader 35 is transferred to the specified destination by the data transfer unit 36.

Figure 9:
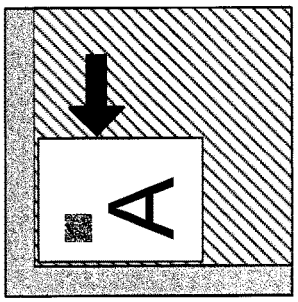
FIG. 9 illustrates an example of the screen when the setting contents of scan parameters and a guiding image based on the setting contents of scan parameters are displayed together on a single display screen.

In FIGS. 7 and 8, the setting contents of scan parameters and the guiding image based on the setting contents of scan parameters are displayed on different display screens. However, both of the setting contents of scan parameters and the guiding image may be displayed together on a single display screen, as shown in FIG. 9. For the sake of simple description, a description will be given below, assuming that both of the setting contents of scan parameters and the guiding image based on the setting contents are displayed on a single screen, as shown in FIG. 9.

FIGS. 10 through 14 illustrate how a guiding image will be changed in accordance with various setting contents of scan parameters.

Figure 10:
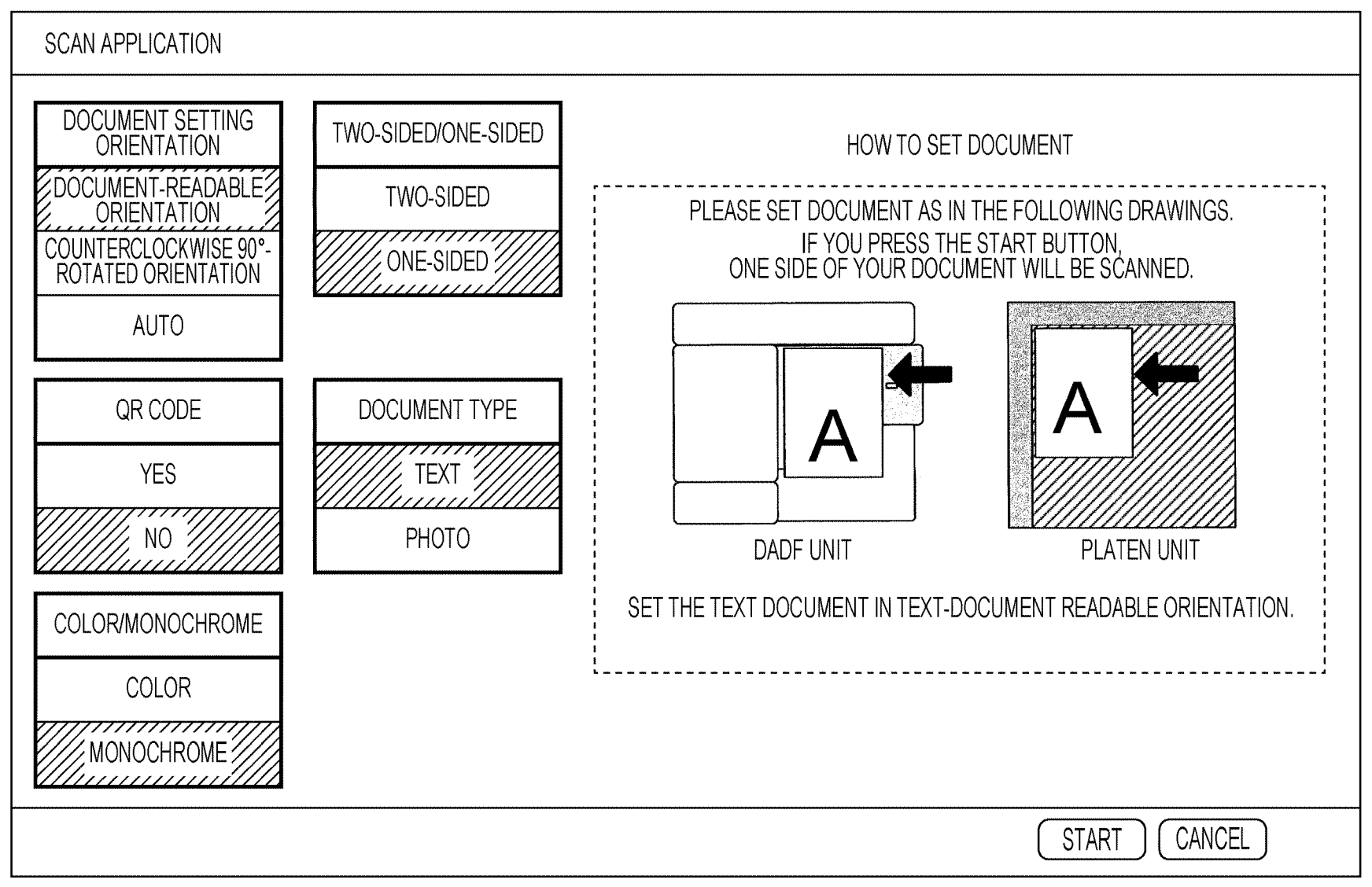

In the example of the display screen shown in FIG. 10, compared with the guiding image on the display screen shown in FIG. 9, the parameter concerning the use of a QR code is changed from "Yes" to "No".

By referring to the display screen shown in FIG. 10, it is seen that the image of the QR code and the text message "QR code will be read" are erased from the guiding image on the display screen shown in FIG. 9.

Figure 11:
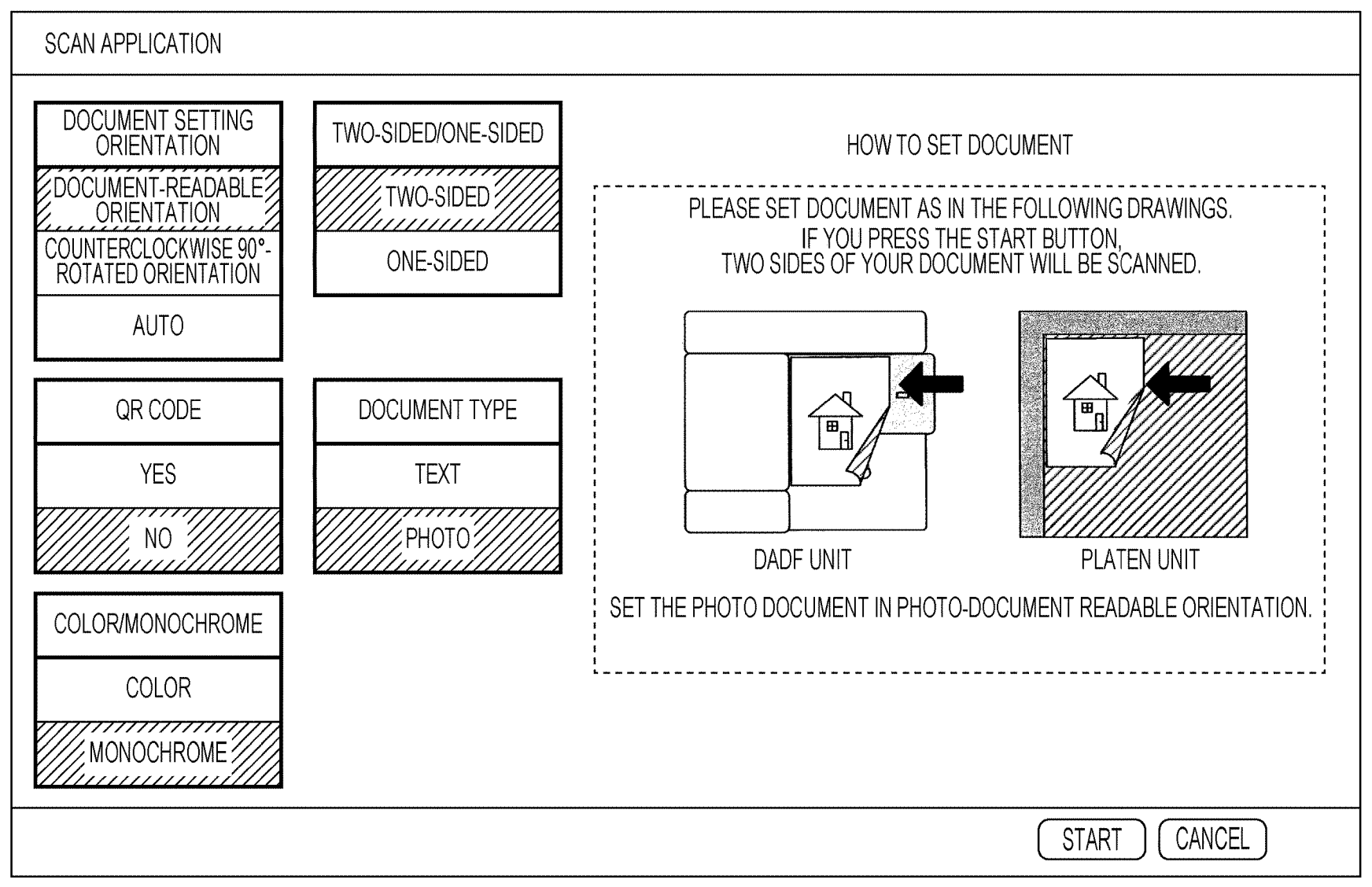

In the example of the display screen shown in FIG. 11, compared with the guiding image on the display screen shown in FIG. 10, the parameter concerning the document reading mode is changed from "one-sided" to "two-sided" and the document type is changed from "text" to "photo".

By referring to the display screen shown in FIG. 11, it is seen that the image of the document on the display screen shown in FIG. 10 is changed to an image of the document in which part of a sheet is turned over, and the text message "if you press the start button, one side of your document will be scanned" is changed to a text message "if you press the start button, two sides of your document will be scanned".

On the display screen shown in FIG. 11, it is seen that the text message "set the text document in a text-document readable orientation" is changed to a text message "set the photo document in a photo-document readable orientation". Additionally, the character image "A" in an erect state is changed to an image of a house in an erect state.

Figure 12:
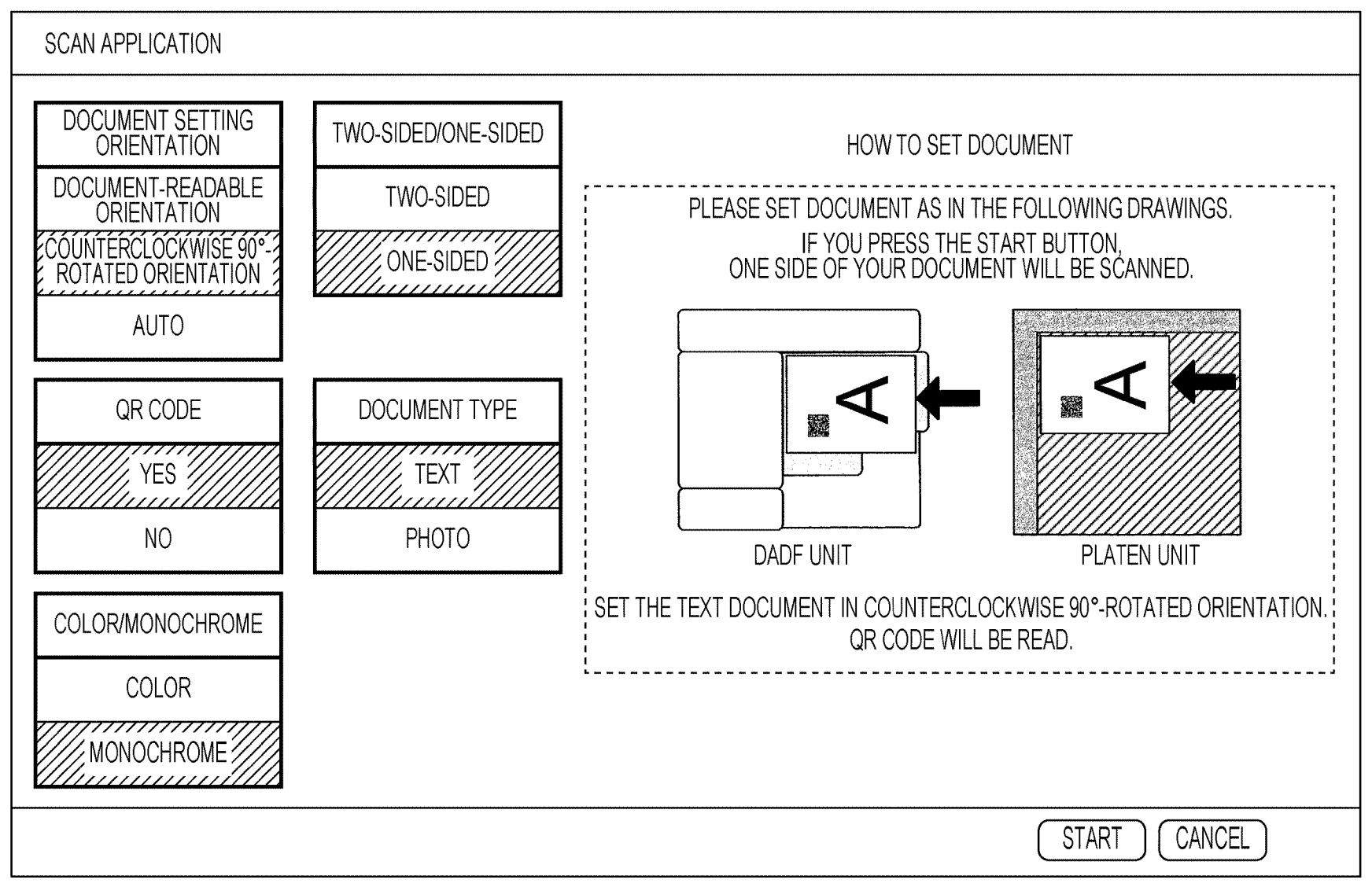

In the example of the display screen shown in FIG. 12, compared with the display screen shown in FIG. 9, the document setting orientation is changed from "document-readable orientation" to "counterclockwise 90°-rotated orientation".

By referring to the display screen shown in FIG. 12, it is seen that the orientation of the sheets of the document is changed by 90 degrees from that on the display screen shown in FIG. 9, and the text message "set the text document in a text-document readable orientation" is changed to a text message "set the text document in the counterclockwise 90°-rotated orientation".

Figure 13:
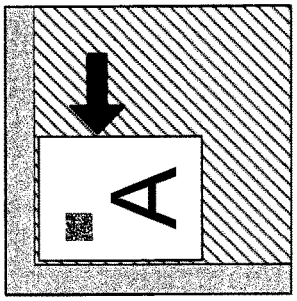

In comparison with the display screen shown in FIG. 9, the example of the display screen shown in FIG. 13 shows that an abnormality has occurred to the DADF unit and the DADF unit is not functioning properly.

By referring to the display screen shown in FIG. 13, it is seen that the image of the DADF unit is erased from the guiding image of the display screen shown in FIG. 9 and only the image of the platen unit is displayed. On the display screen shown in FIG. 13, it is seen that a text message "*DADF unit is out of order and cannot be used" is displayed and the user is instructed not to set a document in the DADF unit.

Figure 14:
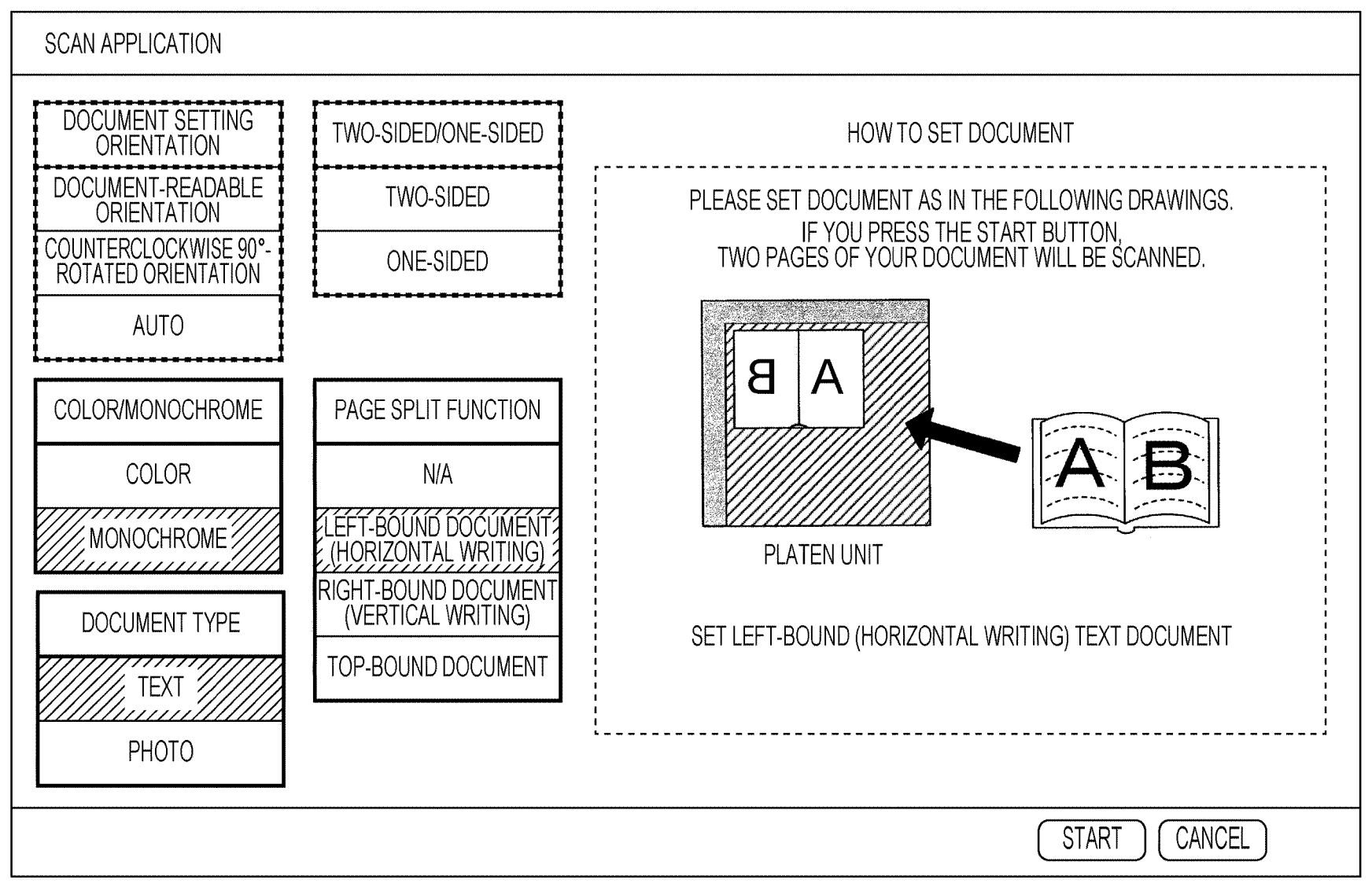

FIG. 14 shows an example of the display screen when a page split function is set as a scan parameter.

On the display screen shown in FIG. 14, as the setting content of the page split function, "left-bound document (horizontal writing)" is set. Accordingly, in the guiding image, a text message "set left-bound (horizontal writing) text document" is displayed, and an image indicating that a book-form document is opened and pressed against the platen unit is displayed.

Since the page split function is enabled in the display example shown in FIG. 14, the settings of scan parameters concerning the document setting orientation and the two-sided/one-sided reading mode are disabled.

Additionally, since the page split function is implemented only in the platen unit, the image of the DADF unit is not displayed in the guiding image shown in FIG. 14.

Figure 15:
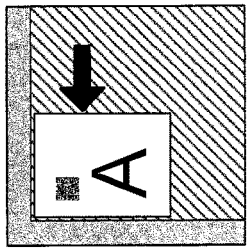
FIG. 15 is an external view of a tablet terminal device which is detachable from the body of the image forming apparatus.

In the above-described examples, a guiding image based on set scan parameters is displayed on the operation panel 61 of the image forming apparatus 10, as shown in FIG. 5. However, instead of the operation panel 61, a guiding image based on set scan parameters may be displayed in the tablet terminal device 70, as shown in FIG. 15.

Generally, the tablet terminal device 70 is attached to the body of the image forming apparatus 10 and manipulates the operation of the image forming apparatus 10. If necessary, the tablet terminal device 70 may be removed from the body of the image forming apparatus 10 and remotely manipulate the operation of the image forming apparatus 10.

Figure 16:
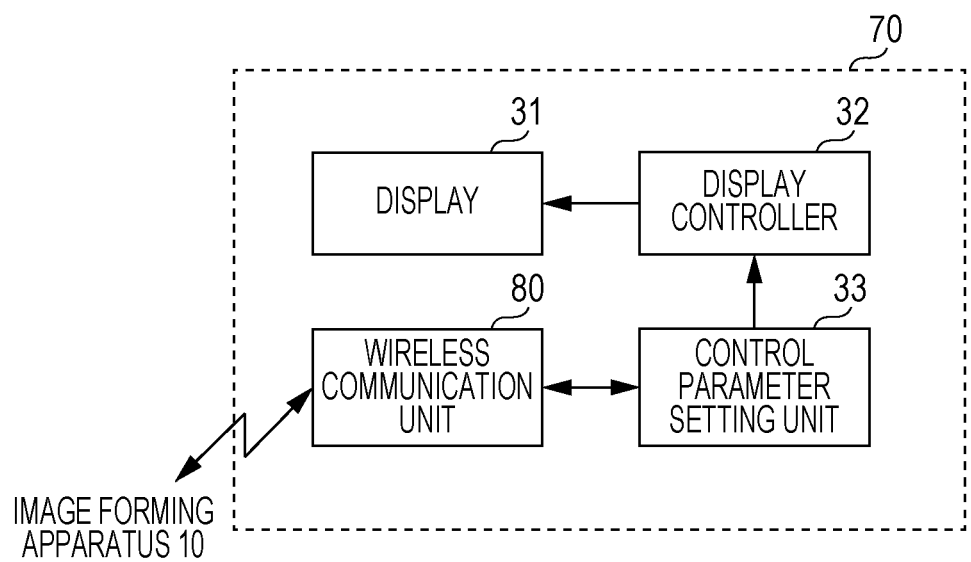
FIG. 16 is a block diagram illustrating an example of the functional configuration of the tablet terminal device shown in FIG. 15.

An example of the functional configuration of the tablet terminal device 70 is shown in FIG. 16. As shown in FIG. 16, the tablet terminal device 70 includes a display 31, a display controller 32, a control parameter setting unit 33, and a wireless communication unit 80.

In FIG. 16, elements that perform the same operations as those shown in FIG. 3 are designated by like reference numerals. That is, the display 31, the display controller 32, and the control parameter setting unit 33 of the tablet terminal device 70 perform operations similar to those of the counterparts shown in FIG. 3.

Then, the wireless communication unit 80 performs near field wireless communication with the body of the image forming apparatus 10 so as to send the content of control parameters set by the control parameter setting unit 33 to the body of the image forming apparatus 10 or to receive information, for example, concerning the state of the image forming apparatus 10 from the image forming apparatus 10.

In this manner, the present invention is also applicable to information processing apparatuses without an image reader, such as the tablet terminal device 70, smartphones, and cellular phones.

In the above-described exemplary embodiment, the present invention is applied to the image forming apparatus 10, which is a so-called multifunction device. However, the present invention is not restricted to this type of device, and may also be applicable to image reading apparatuses having a scan function.

In the above-described exemplary embodiment, a guiding image based on plural scan parameters and indicating an instruction concerning how to set a document is displayed. However, the content of a guiding image may be supplied to a user by sound.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
a processor configured to:
set setting contents of a plurality of scan parameters to be used when reading image data from a document by a reader, each of the scan parameters being associated with a plurality of content options;
perform control so that an instruction concerning how to set the document in the reader will be displayed for a user, on the basis of the set setting contents of the plurality of scan parameters; and
perform control so that the instruction concerning how to set the document to be displayed for the user will be changed and displayed every time the user changes the setting contents of a said scanning parameter from one of the plurality of content options to another of the content options; and
a reader that reads image data from the document set in accordance with the displayed instruction,
wherein the processor is further configured so that the user can change the setting contents of a said scanning parameter while the instruction concerning how to set the document is displayed, and
wherein the displayed instruction is determined by the processor based on a plurality of the content options selected by the user.

2. The image reading apparatus according to claim 1, wherein the processor performs control so that an image generated on the basis of a combination of the setting contents of the plurality of scan parameters will be displayed.

3. The image reading apparatus according to claim 1, wherein the setting contents is setting information concerning reading processing for reading the image data from the document by the reader.

4. The image reading apparatus according to claim 1, wherein the setting contents of the plurality of scan parameters includes at least two items of information concerning a document setting orientation, a document type, a reading document size, a reading color mode, a reading resolution, whether or not two-sided reading is specified, and whether or not a two-dimensional code is used.

5. The image reading apparatus according to claim 1, wherein:
the reader includes an automatic document feeder that is capable of sequentially feeding and reading a plurality of pages of a document and a single page document reader that is able to set and read only one page of a document at one time; and
the processor changes the instruction concerning how to set the document to be displayed for the user in accordance with operating states of the automatic document feeder and the single page document reader.

6. The image reading apparatus according to claim 1, wherein the displayed instruction is a drawing of the reader with the document located thereon.

7. The image reading apparatus according to claim 1, further comprising a tablet terminal device comprising the processor and a wireless communicator, wherein the tablet terminal device communicates with the reader by way of the wireless communicator.

8. An image forming apparatus comprising:

a reader that reads image data from a document;

a processor configured to:

set setting contents of a plurality of scan parameters to be used when reading the image data from the document by the reader, each of the scan parameters being associated with a plurality of content options;

perform control so that an instruction concerning how to set the document in the reader will be displayed for a user, on the basis of the set setting contents of the plurality of scan parameters; and perform control so that the instruction concerning how to set the document to be displayed for the user will be changed and displayed every time the user changes the setting contents of a said scanning parameter from one of the plurality of content options to another of the content options; and a printer that outputs on a recording medium an image based on the image data read by the reader or image data to be output, wherein the processor is further configured so that the user can change the setting contents of a said scanning parameter while the instruction concerning how to set the document is displayed, and wherein the displayed instruction is determined by the processor based on a plurality of the content options selected by the user.

9. A non-transitory computer readable medium storing a program causing a computer to execute a process, the process comprising:

setting contents of a plurality of scan parameters to be used when reading image data from a document by a reader, each of the scan parameters being associated with a plurality of content options;

performing control so that an instruction concerning how to set the document in the reader will be displayed for a user, on the basis of the set setting contents of the plurality of scan parameters;

performing control so that the instruction concerning how to set the document to be displayed for the user will be changed and displayed every time the user changes the setting contents of a said scanning parameter from one of the plurality of content options to another of the content options; and reading image data from the document set in accordance with the displayed instruction, wherein the control is performed such that the user can change the setting contents of a said scanning parameter while the instruction concerning how to set the document is displayed, and wherein the control is performed such that the displayed instruction is determined based on a plurality of the content options selected by the user.

* * * * *